May 16, 1933.    H. W. JONES    1,909,278
BATTERY LANTERN
Filed March 3, 1925    2 Sheets-Sheet 1
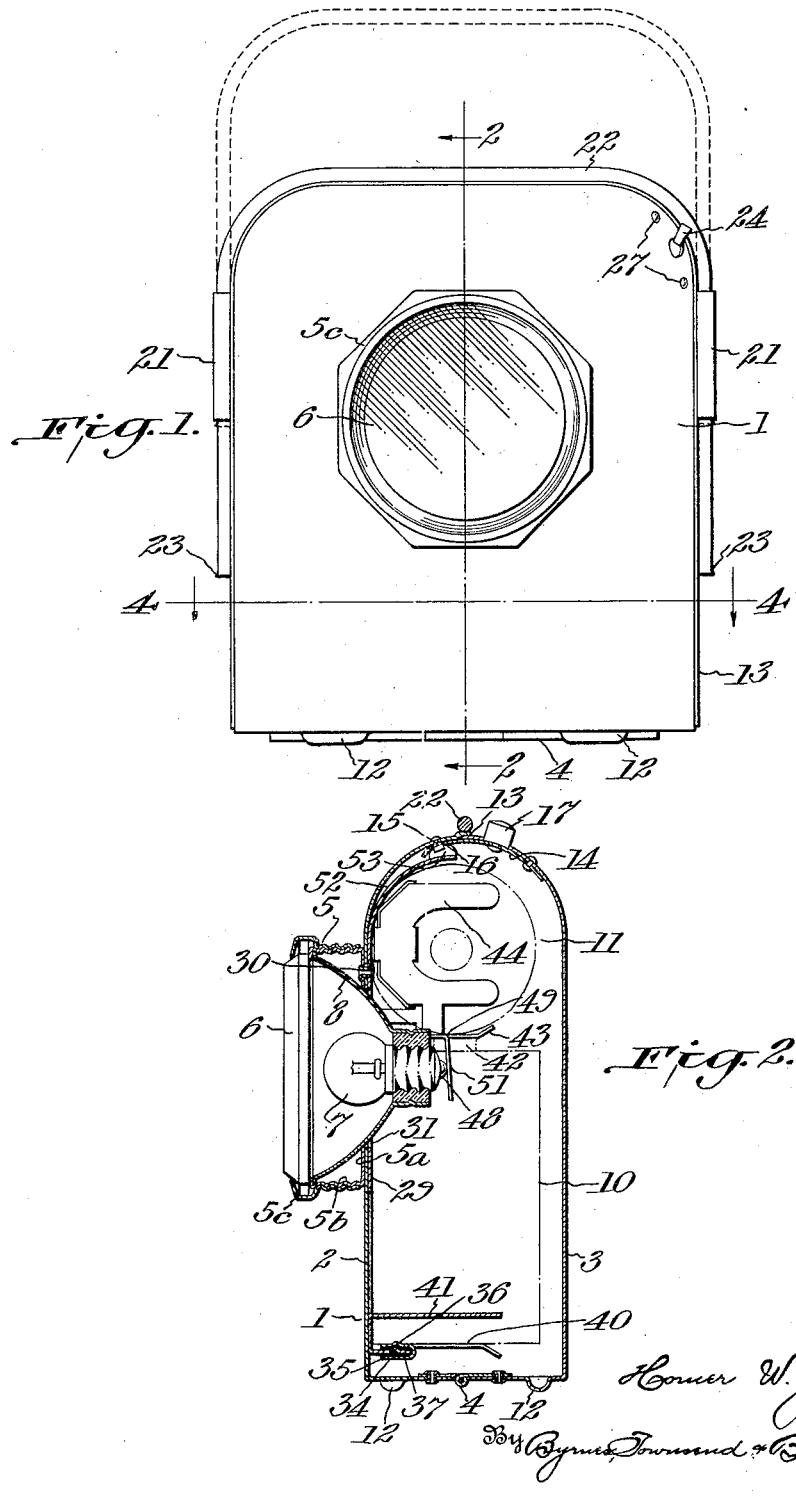
Inventor:
Homer W. Jones,
By Byrne, Townsend & Brickenstein,
Attorneys.

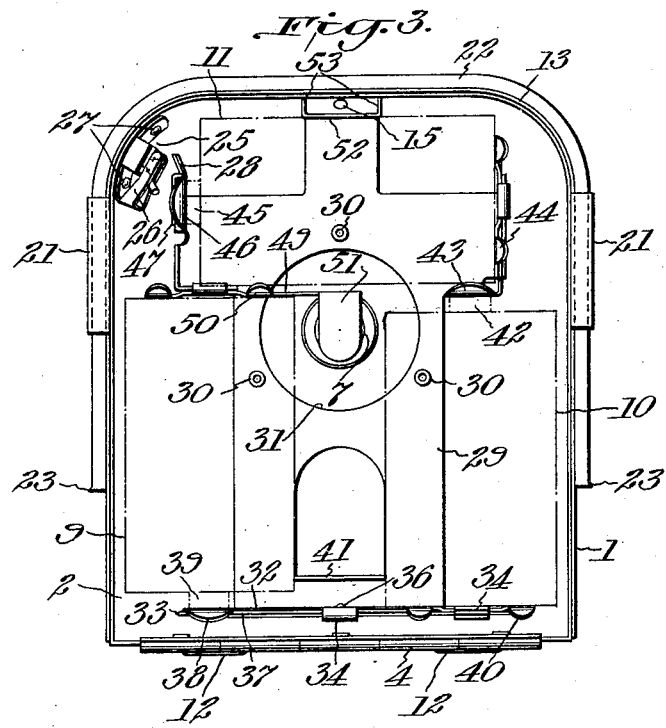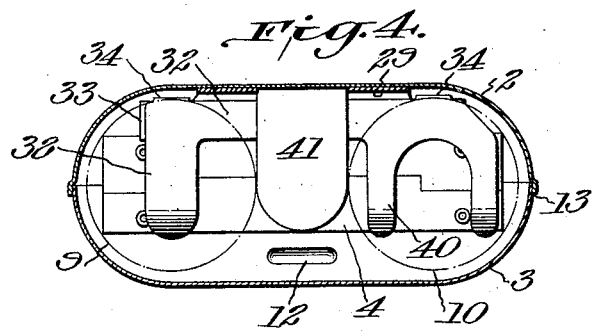

Patented May 16, 1933

1,909,278

UNITED STATES PATENT OFFICE

HOMER W. JONES, OF JACKSON HEIGHTS, NEW YORK, ASSIGNOR TO NATIONAL CARBON COMPANY, INC., A CORPORATION OF NEW YORK

BATTERY LANTERN

Application filed March 3, 1925. Serial No. 12,949.

This invention relates to battery hand lanterns and has for its principal object to provide a lantern which is compact, attractive, and efficient, and which can be manufactured economically.

An important feature of the invention has to do with an arrangement of battery cells and connections therefor within the lantern casing whereby a compact and economical organization is made possible. As illustrated three cylindrical dry cells are employed, two being arranged vertically side by side at a short distance from each other, with the third extending horizontally across the tops of the first two substantially between the centers thereof. This arrangement is combined with other features to produce several desirable results.

It makes possible the use of a casing which is cheap to manufacture. The cells are housed in a flat casing that conforms closely to the cell peripheries, the casing having round ends and a round top to fit the round outer halves of all three of the cells, and a flat base. The round ends and top are joined smoothly through round corners. This configuration, besides enabling the casing to fit the cells closely without waste space, saves material, and reduces the liability of rupturing the material when it is being died to form the casing.

In order that the round top and round ends may be smoothly merged through round corners the casing is necessarily made somewhat longer than the combined diameters of the vertically disposed cells. The excess length is utilized by spacing the vertically disposed cells apart to form a funnel mouthed space centrally of the casing, and fitting the reflector and lamp, which taper rearwardly, well back into this space. With this construction a very short reflector enclosing head may be employed, which is desirable because a short head combines with the casing body to form a well balanced lamp, of attractive appearance, and of a convenient shape to pack.

Provision is made of means, built into the casing, for supporting and holding the cells and for electrically connecting them in series, it being a point that the cell contacts also serve to support the cells and to hold them in place.

It is also a feature that certain of the cell terminal contacts, forming part of the connecting means, are constructed to engage with terminals of one sign but to avoid contact with terminals of the opposite sign, thus avoiding the making of a circuit which includes cells of reverse polarity, and compelling all the cells to be properly placed before any current can flow. This safeguard is especially important for the reason that the circuit making connections require one of the vertical cells to stand in an upright position and the other in an inverted position, which is apt to be confusing.

Other objects and advantages will hereinafter appear.

In the drawings, Fig. 1 is a front elevation of a battery lantern embodying the features of the present invention;

Fig. 2 is a sectional side elevation of the same;

Fig. 3 is a view in elevation of the interior of the front half of the lantern, the cells being indicated in dot and dash lines; and Fig. 4 is a horizontal section on the line 4—4 of Fig. 1.

The battery lantern illustrated includes a casing body 1 comprising front and rear halves 2 and 3 connected by a hinge 4, and a head 5 secured on the casing and enclosing the usual lens 6, lamp bulb 7, and reflector 8.

Provision is made within the casing of three dry cells 9, 10 and 11, and of means, to be described, for supporting them in a very compact arrangement and connecting them in series with the lamp bulb 7.

The arrangement of the cells in the casing is indicated in Fig. 3. The cells 9 and 10 extend vertically side by side but spaced a short distance from one another, and the cell 11 extends horizontally across the tops of the other two. The reflector 8 and lamp bulb 7, which form a unit of tapering contour, are set well back into the body of the casing 1, fitting between the converging peripheries of the cells 9 and 10 and extending into the space between them. The reflector 8 and lamp bulb 7 are enclosed in the head 5 which projects forward only a short distance from the front of the casing body.

The front of the casing has a substantially circular opening therethrough, in register with a similar opening defined by the edge of an inturned flange 5a and a threaded shell 5b forming part of the lantern head 5. The lens 6 and reflector 8 are secured to the threaded shell 5b by a lens ring 5c screwed thereon. The reflector 8 projects into the lantern case through the registering openings in the case and shell 5b, and is rigidly clamped against the edge of the opening in said shell.

The ends and top of the casing 1 are made round to conform to the outer halves of the cells and are connected through round corners. The casing thus constructed holds the cells snugly, substantially without waste space and may be made with the minimum of material. It is also a point that the casing halves having rounded edges and corners can be stamped from sheet material without danger of rupture. The casing halves, as first stamped, are identical. These halves may be initially formed, therefore, from the same material and upon the same machines indiscriminately. This reduces the machinery required and avoids the necessity of carrying separate stocks of backs and fronts.

The hinge 4 whereby the casing halves 2 and 3 are connected projects downward beyond the bottom surface of the casing. Provision is made however for stabilizing the casing base by pressing bosses or humps 12 outward from the casing bottom farther than the hinge 4 to form supporting feet for the battery lamp.

The front half 2 of the casing has its rear margin pressed outward slightly to form a rim 13 for overlapping the complementary rear casing section 3 when the casing is closed.

The casing is held closed by a spring latch member 14 secured at its rear end upon the casing section 3, in cooperation with a lug or pin 15 that projects inward from the front casing section 2. The member 14 is inclined downward at its forward end so that it may be cammed down by the lug 15. An opening 16 in the member 14 snaps over the lug 15 to hold the casing closed. A finger piece 17 secured upon the member 14 projects through the casing and may be depressed to free the lug 15 to permit the casing to be opened. The member 14 is mounted for flexure in the plane in which it swings so that no side strain or twisting is imposed upon it.

Sleeves 21 are formed from short ears or extensions on the rim 13 and these sleeves serve as bearings in which a rigid bail or handle 22 is slidingly mounted. The handle 22 may be slid to the full line position shown in Fig. 1 when not in use. In this position it hugs the casing 1 closely. It may also be slid in a plane intersecting the axis of the bulb 7 to the dotted line position of Fig. 1 for use. The lower extremities 23 of the handle are upset or otherwise slightly enlarged to prevent their withdrawal from the sleeves 21. The fact that the handle is non-rotatable enables it to function also as a guard for a circuit controlling switch lever 24 located at one of the upper corners of the casing. The handle 22 prevents damage to the switch or accidental operation thereof, and also prevents snagging of clothing by the switch and other possible damage.

The switch 25, which may be like the one described and claimed in the application of L. J. Voorhees, Serial No. 8803, filed Feb. 12, 1925, comprises the switch lever 24 swingable through the casing in a plane at right angles thereto and a combined guide, detent and bearing member 26 for the switch lever, secured to the interior of the casing by rivets 27. The lever 24 is swingable into and out of engagement with a contact 28 to make and break the circuit through electrical connections that are built into the casing.

The cells and the conductors which connect them in series with the lamp are all carried by a frame 29 secured by rivets 30 to the front casing section 2. The rivets 30 extend through the portion of the casing which is covered by the head 5, and may also form the means of securing the head to the body portion 2, so that the visible exterior of the casing is unbroken. The frame 29 may be of conducting material but in that case all of the contacts and connections carried by it are insulated from it. The frame includes an upright main body portion having an opening 31 through which the reflector 8 passes, and various rearwardly projecting connector supports.

A conductor and contact member 32 is secured upon a horizontal shelf 33 at the lower end of the frame 29 by fingers 34 wrapped around the shelf. The member 32 is located on the shelf and held against shifting relatively to it by a small hump 35 pressed from the shelf that fits within a small cavity 36 pressed in the member 32. A sheet 37 of insulating material, interposed between the shelf 33 and the member 32, is thin and flexible enough to conform to the hump 35 and the cavity 36 so that it does not prevent their cooperation with one another.

The other conductor members supported by the frame 29 may be similarly positioned on, secured to, and insulated from their respective supports but these features will not be again described in detail.

The conductor member 32 comprises a spring arm 38 for engaging the positive terminal 39 of the inverted cell 9 and supporting it, and a pair of spring arms forming a U-shaped contact and support 40 for the negative end of the upright cell 10. The cells 9 and 10 are definitely positioned when inserted in the casing, by engagement with the casing and with a spacing tongue 41 forming part of the frame, and the arms of the U-shaped contact 40 are formed to straddle the center of the cell 10 so positioned. The contact 40 is incapable of engaging the centrally located positive terminal 42 of the cell 10 so that no current can possibly flow through the contact 40 and the cell if the cell is put in place wrong end up by mistake. Reversal of the other cells 9 and 11 end for end is similarly guarded against by following the same principle in constructing the other negative cell contacts to be described. A holder is thus provided for each cell into and from which it may be inserted and removed laterally,— that is to say, in a direction perpendicular to the axis of the cell. Each cell has a positive and a negative terminal, which are located at opposite ends of the cell and severally engage the opposed positive and negative resilient contacts of the holder to complete the circuit through the cell when such cell is properly inserted, but no circuit will be completed through the holder and cell if the latter is inserted with its terminals reversed. The holder will, however, grip and hold the cell in either properly inserted or reversed position, but in the latter position the spaced portions on the U-shaped contact will not engage the center cell terminal.

The positive terminal 42 at the upper end of the cell 10 is engaged by a spring arm 43 supported from a horizontal projection of the frame. This arm 43 is electrically connected to a U-shaped contact 44 for engaging the negative end of the horizontally disposed cell 11, the latter contact being mounted upon a vertical frame projection.

The cell 11 at its opposite end has its positive terminal 45 engaged by a spring arm 46 forming part of a conductor 47 supported on a rearward projection of the frame 29. The switch lever 24 previously referred to is pivotally mounted for movement into engagement with a contact 28 forming part of the conductor 47 to establish a circuit from the cells through the casing 1 to the lamp 7. The current passes from the negative lamp terminal 48 through a conductor member 49 to the upper negative end of the cell 9 so that the circuit is complete. The conductor member 49 is supported on a frame projection and comprises a U-shaped contact 50 for the cell 9 and a downwardly extending spring contact member 51 for engaging the negative lamp terminal.

Each cell is supported between a positive contact at one of its ends and a U-shaped negative contact at its opposite end, these contacts being arranged both to effect the desired electrical connection when the cells are properly put in place, and also cooperating to yieldingly grip and detain the cells in place.

The spring latch member 14 is likely to strike and damage the paper jacket of cell 11 when the casing is being closed. Provision is therefore made of a guard for spacing the cell 11 downward a short distance from the casing to provide a definite clearance space for the member 14. This guard may consist of a curved shield 52 projecting up from the frame 29 and having upturned spacing ears 53 at the sides of its upper end for engaging the casing section 2.

Variations may be resorted to within the scope of the invention and parts of the improvements may be used without others.

I claim:

1. In a battery hand lamp, the combination with a lamp bulb, of a compactly arranged battery in circuit with the lamp bulb comprising a plurality of cells arranged vertically side by side, and a cell arranged horizontally part way across the tops of the first mentioned cells, a flat casing body snugly enclosing the cells, said casing body having round cell fitting ends and top merged through round upper corners, and a switch, comprising a finger-piece located at one of the upper corners for convenient operation, and means mounted in the space at said corner beyond the ends of the cells for operation by the finger piece to make and break the lamp battery circuit.

2. In a battery hand lamp, the combination with a lamp bulb, of a battery in circuit with the lamp bulb comprising two cylindrical cells arranged vertically side by side, and a third cylindrical cell arranged horizontally across the tops of the other two, and a flat casing having rounded ends and top, and a flat bottom, all substantially fitting the cells.

3. In a battery hand lamp, the combination with a lamp bulb, of a battery in circuit therewith comprising a horizontally disposed cylindrical cell, and two vertically disposed cylindrical cells arranged side by side beneath the horizontally disposed cell, means spacing the vertically disposed cells from one another to cause their centers to lie substantially in the planes of the ends of the horizontally disposed cell, a flat casing body snugly enclosing the cells, said casing body having round cell fitting ends and top merged through round upper corners, a rearwardly tapering reflector and lamp bulb unit extending into the casing body between the cells and projecting forward only a short distance beyond the front of the casing body and a short head enclosing said reflector and lamp bulb unit.

4. In a battery hand lamp, the combination with a lamp bulb and a casing, of a battery in the casing, said battery comprising a cell, and positive and negative cell terminal contacts constructed for cooperation with opposite ends of the cell, both to connect the cell in circuit and to grip and hold the cell, the positive cell contact being arranged to engage the centrally located positive cell terminal, but the negative cell contact being U-shaped to straddle the center of the cell, and avoid contact with the positive cell terminal in case the cell is erroneously placed between the contacts with its ends reversed.

5. In a battery hand lamp, the combination with a lamp bulb and a casing, of a battery in the casing, comprising two vertically disposed cells, one in upright position and the other in an inverted position, and a cell extending horizontally across the upper ends of the vertically disposed cells, and means connecting all three cells in series comprising positive and negative cell contacts, the negative contacts being constructed to avoid engagement with the positive cell terminals to prevent the reversal of any cell end for end in the circuit.

6. In a battery hand lamp, the combination with a lamp bulb and a casing, of a battery in the casing in circuit with the lamp bulb comprising two vertically disposed cells, and a horizontally disposed cell across the tops of the vertically disposed cells, and circuit making connections in the casing, comprising cell contacts beneath the vertically disposed cells arranged to support them, the contacts at the upper ends of the vertically disposed cells cooperating with the first mentioned contacts to grip said cells and hold them in place, the upper contacts also forming supports for the horizontally disposed cell, and contacts at opposite ends of the horizontally disposed cell cooperating to grip it and hold it in place.

7. In a battery hand lamp, the combination with a casing, of a battery in the casing comprising a plurality of cells, a frame in the casing forming a support for the cells, cell connections mounted on the frame comprising a conductor for contacting a cell terminal, said conductor and frame being formed to provide cooperating locating members to control the position of the conductor on the frame, and fingers bendable to secure the conductor to the frame in the position determined by the locating members.

8. In a battery hand lamp, the combination with a casing, of a battery in the casing comprising two cells arranged side by side in spaced relation and a third cell across the ends of the other two, and a cell connecting, supporting, and positioning unit comprising contacts for the positive and negative terminals of all the cells and a frame on which all the contacts are mounted, said frame having a tongue projecting between the first mentioned cells for spacing them, and locating them in cooperative relation to the contacts.

9. In a battery hand lamp, the combination with a casing, of a battery in the casing comprising two cells arranged side by side in spaced relation and a third cell across the ends of the other two, and a cell connecting, supporting, and positioning unit comprising three connected pairs of contacts for the positive and negative terminals of all the cells and a conductive frame on which all the contacts are mounted, and means joining the frame to the casing and thereby securing the entire unit in place.

10. In a battery hand lamp, the combination with a casing, of a battery in the casing comprising two cells arranged side by side in spaced relation and a third cell across the ends of the other two, and a cell connecting, supporting, and positioning unit comprising contacts for the positive and negative terminals of all the cells and a frame on which all the contacts are mounted, a lamp bulb enclosing head on the front of the casing, and means passed through the head, the casing and the frame for securing all three members together.

11. In a battery hand lamp, the combination with a casing of a battery in the casing comprising individual cells, connections in the casing comprising cell contacts, a frame supporting all of said contacts, a head on said casing covering a portion of the front thereof, and means securing the frame to the front of the casing within the area covered by the head, whereby all the cell contacts are secured in place without visibly mutilating the casing.

12. In a battery hand lamp, the combination with a lamp bulb, and a battery in circuit with said bulb, of a casing enclosing the battery, a carrying handle rigidly mounted on the casing for movement between active and inactive positions, and a switch handle exterior to the casing and located close to the carrying handle in position to be guarded by the carrying handle against accidental operation and injury when the carrying handle is in either active or inactive position.

13. In a battery hand lamp, the combination of a casing comprising a wall having an opening therethrough; a shell secured to said wall and including an inturned flange having its inner edge contiguous to the edge of said opening; a cell support secured to the inside of said wall and having an opening in register with the opening in said wall; and a reflector mounted in said shell and projecting through said registering openings into said casing.

In testimony whereof, I affix my signature.

HOMER W. JONES.